United States Patent Office 3,726,876
Patented Apr. 10, 1973

---

3,726,876
3-SUBSTITUTED - 6-ALKYL-2,3,6,9-TETRAHYDRO-2,9-DIOXOTHIAZOLO[5,4-f]-QUINOLINE - 8-CARBOXYLIC ACIDS AND METHODS FOR PRODUCING SAME
Renzo Dohmori, Senkichi Nagasaki, Shizuo Kadoya, Isao Takamura, and Norio Suzuki, Tokyo, Japan, assignors to Daiichi Seiyaku Co., Ltd., Tokyo, Japan
No Drawing. Filed Apr. 20, 1971, Ser. No. 135,754
Claims priority, application Japan, Apr. 27, 1970, 45/35,372
Int. Cl. C07d 33/48
U.S. Cl. 260—283 S     9 Claims

ABSTRACT OF THE DISCLOSURE

3 - substituted-6-alkyl-2,3,6,9-tetrahydro-2,9-dioxothiazolo[5,4-f]-quinoline-8-carboxylic acids have been synthesized and found to be characterized by excellent antibacterial activity against gram-negative and gram-positive bacteria.

BACKGROUND OF THE INVENTION

Field of the invention

This invention relates to novel thiazoloquinoline derivatives and to processes for their preparation.

Description of prior art

Very few drugs, except for gentamycin and colistin, are effective toward pseudomonas group strains and only a few known drugs have shown effectiveness toward multi-resistant strains, particularly those strains resistant to nalidixic acid.

It would be desirable, therefore, to provide compounds which have excellent antibacterial activity against both gram-negative and gram-positive bacteria and which are particularly effective toward pseudomonas group and nalidixic acid resistant strains.

SUMMARY OF THE INVENTION

This and other objects have now herein been provided by the compound having the formula.

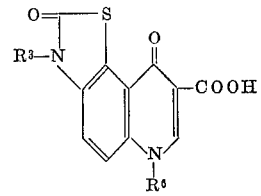

wherein $R^6$ represents an alkyl group having one to six carbon atoms and $R^3$ represents an alkyl group having one to six carbon atoms or an allyl group.

DETAILED DESCRIPTION OF PREFERRED EMBODIMENTS

The compounds of this invention can be prepared by reacting 2-hydroxy-6-substituted-6,9-dihydro - 9 - oxothiazolo[5,4-f]-quinoline-8-carboxylic acid with an alkylating agent. Suitable alkylating agents include the halides such as ethyl iodide, dialkyl sulfate, such as dimethyl sulfate or diethyl sulfate, and the like.

The reaction is carried out preferably in the presence of an acid-asceptor. Suitable acid-acceptors include the organic or inorganic bases, such as potassium hydroxide, postassium carbonate, triethyl amine, and the like, or mixture thereof.

The reaction may be generally carried out in a suitable solvent, e.g. water, aqueous or non-aqueous organic solvents, such as alcohols, dioxane, acetone, dimethylformamide, dimethylsulfoxide, acetonitrile or mixtures thereof When a non-aqueous solvent is used, the carboxyl group at the 8-position may also be esterified together with the alkylation at 3-position. Therefore, the ester should be hydrolyzed to obtain the desired compound.

The reaction temperature is not critical and good results are obtainable when the reaction is conducted at a temperature between room temperature and 150° C. to accomplish the alkylation within a period from 20 minutes to 20 hours.

The final product may be converted into a salt form by conventional methods. Exemplary of salt forms are the alkali metal salts, the alkaline earth metal salts and the salts of organic bases, such as the ammonium or organic amine salts, and the like.

The following table will illustrate the superior antibacterial activity of the present compounds against a variety of both gram-negative and gram-positive microorganisms.

TABLE.—THE MINIMUM INHIBITORY CONCENTRATION (µg.) OF THE REPRESENTATIVE COMPOUNDS OF THIS INVENTION USING SEMI-SYNTHETIC MEDIUM FOR *SHIGELLA DYSENTERIAE*

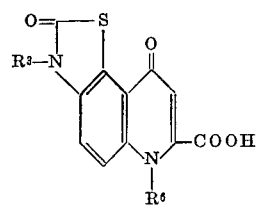

| | $R^3$ | Me | Me | Et | Et | Allyl | Allyl | Nalidixic acid |
|---|---|---|---|---|---|---|---|---|
| | $R^6$ | Me | Et | Me | Et | Me | Et | |
| *Escherichia coli* 0111 | | <1.6 | <1.6 | <1.6 | <1.6 | <1.6 | <1.6 | 3.2 |
| *Escherichia coli* K-12 [1] | | <1.6 | <1.6 | <1.6 | | | | >100 |
| *Shigella dysenteriae* Hanabusa | | <1.6 | <1.6 | <1.6 | <1.6 | <1.6 | <1.6 | 3.2 |
| *Shigella flexneri* 253 [2] | | <1.6 | <1.6 | <1.6 | <1.6 | <1.6 | <3.2 | 6.3 |
| *Shigella flexneri* JSI 644 [1][2] | | <1.6 | <1.6 | <1.6 | 12.5 | 6.3 | 12.5 | >100 |
| *Salmonella typhosa* H901 | | <1.6 | <1.6 | <1.6 | <1.6 | <1.6 | <1.6 | 3.2 |
| *Pseudomonas aeruginosa* Tsuchijima | | 6.3 | 6.3 | 6.3 | | | | >100 |
| *Proteus vulgaris* 3167 | | <1.6 | <1.6 | <1.6 | <1.6 | <1.6 | <1.6 | 6.3 |
| *Staphylococcus aureus* | | 6.3 | <1.6 | 3.2 | 6.3 | 6.3 | 3.2 | >100 |
| *Staphylococcus aureus* R [1] | | 6.3 | <1.6 | <1.6 | 6.3 | 6.3 | 6.3 | >100 |
| *Corynebacterium diphtheriae* PW 8 | | <1.6 | <1.6 | 12.5 | 12.5 | 6.3 | 12.5 | 25 |

[1] Nalidixic acid resistant strain.
[2] Multi-resistant strain isolated from clinical case.

Example 1.—Preparation of starting material

A mixture of 15 g. of 6-amino-2-methylthiobenzothiazole and 16.6 g. of diethyl ethoxymethylenemalonate in 75 ml. of Dowtherm A (Dow Chemical Co.) was heated at 105–110° C. for 2 hours and allowed to cool. The solid that separated was recrystallized from acetone to give 21.8 g. of 2-methylthio-6-[bis(2,2-ethoxycarbonyl)ethenyl-amino]benzothiazole melting at 132–134° C. as colorless needles.

*Analysis.*—Calcd. for $C_{16}H_{18}O_4N_2S_2$ (percent): C, 52.44; H, 4.95; N, 7.65. Found (percent): C, 52.45; H, 5.08; N, 7.80.

A mixture containing 5.0 g. of 2-methylthio-6-[bis(2,2-ethoxycarbonyl)ethenylamino] benzothiazole and 50 ml. of Dowtherm A was heated at 240–245° C. for 22 minutes and allowed to cool. Acetone was added to the mixture and the solid which separated was collected and recrystallized from dimethyl sulfoxide. There was thus obtained ethyl 9-hydroxy-2-methylthiothiazole[5,4-f]-quinoline-8-carboxylate melting above 300° C. as pale yellow needles, 3.68 g.

*Analysis.*—Calcd. for $C_{14}H_{12}O_3N_2S_2$ (percent): C, 52.48; H, 3.78; N, 8.75. Found (percent): C, 52.19; H, 3.67; N, 8.94.

A mixture of 4.7 g. of ethyl 9-hydroxy-2-methylthiothiazolo[5,4-f]-quinoline-8-carboxylate, 4.1 g. of potassium carbonate and 11.5 g. of ethyl iodide in 94 ml. of dimethylformamide was stirred at 100–105° C. for 3.5 hours and then concentrated under reduced pressure. The residue was extracted with hot chloroform and the solvent was evaporated to dryness. The resulting product was recrystallized from acetone to give 4.1 g. of ethyl 6-ethyl-6,9-dihydro-2-methylthio-9-oxothiazolo[5,4-f]-quinoline-8 - carboxylate as colorless needles, M.P. 197–199° C.

*Analysis.*—Calcd. for $C_{16}H_{16}O_3N_2S_2$ (percent): C, 55.15; H, 4.63; N, 8.04. Found (percent): C, 55.11; H, 4.59; N, 7.86.

To a stirred solution of 10.4 g. of ethyl 6-ethyl-6-9-dihydro-2-methylthio-9-oxothiazolo[5,4-f]-quinoline-8 - carboxylate in 500 ml. of glacial acetic acid was added dropwise 120 ml. of 7.5% aqueous potassium permanganate solution during one hour at 30–40° C. The reaction mixture was stirred at the same temperature for another 1.5 hours, and sodium sulfite and ice water were added to the mixture. The resulting precipitate was collected and washed with water and methanol. The crude product was recrystallized from 1,2-dichloroethane to yield 8.0 g. of ethyl 6-ethyl-6,9-dihydro-2-methylsulfonyl-9-oxothiazolo[5,4-f]-quinoline-8-carboxylate melting at 235–236° C. as pale yellow prisms.

*Analysis.*—Calcd. for $C_{16}H_{16}O_5N_2S_2$ (percent): C. 50.51; H, 4.24; N, 7.37. Found (percent): C, 50.54; H, 3.95; N, 7.66.

A suspension of 0.38 g. of ethyl 6-ethyl-6,9-dihydro-2-methylsulfonyl-9-oxothiazolo[5,4-f]-quinoline-8 - carboxylate in 7.6 ml. of 10% aqueous potassium hydroxide was stirred at 80° C. (bath temperature) for 1.5 hours. After cooling, the reaction mixture was acidified with acetic acid and the resulting precipitate was collected, washed with water and dried in air. The crude product was recrystallized from dimethylformamide to give 0.24 g. of 6-ethyl-6,9-dihydro-2-hydroxy-9-oxothiazolo[5,4-f] - quinoline-8-carboxylic acid as colorless needles, M.P.>300° C.

*Analysis.*—Calcd. for $C_{13}H_{10}O_4N_2S$ (percent): C, 53.78; H, 3.47; N, 9.65. Found (percent): C, 53.51; H, 3.56; N, 9.88.

Example 2

A mixture of 0.55 g. of 6,9-dihydro-2-hydroxy-6-methyl-9-oxothiazolo[5,4-f]-quinoline-8-carboxylic acid, 0.69 g. of potassium carbonate, 1.14 g. of methyl iodide and 12 ml. of dimethylformamide was stirred at 80–90° C. for 3 hours. Water was added to the cooled reaction mixture and the crystals precipitated were collected, washed and dried. The crude product was recrystallized from dimethylformamide to give 0.47 g. (77%) of methyl 2,3,6,9-tetrahydro-3,6-dimethyl-2,9-dioxothiazolo[5,4-f] - quinoline - 8 - carboxylate as colorless needles, M.P.>300° C.

*Analysis.*—Calcd. for $C_{14}H_{12}O_4N_2S$ (percent): C, 55.25; H, 3.92; N, 9.21. Found (percent): C, 55.07; H, 3.86; N, 9.05.

To a mixture of 0.4 ml. of concentrated hydrochloric acid and 4 ml. of 90% acetic acid was added 0.3 g. of methyl 2,3,6,9 - tetrahydro-3,6-dimethyl-2,9-dioxothiazolo [5,4-f]-quinoline-8-carboxylate and the mixture was refluxed with stirring for one hour. After cooling, the mixture was diluted with water and the resulting crystals were collected and washed with water. The dried product was recrystallized from dimethylformamide to give 0.24 g. (83%) of 2,3,6,9-tetrahydro-3,6-dimethyl-2,9-dioxothiazolo[5,4-f]-quinoline-8-carboxylic acid as colorless needles, M.P.>300° C.

*Analysis.*—Calcd. for $C_{13}H_{10}O_4N_2S$ (percent): C, 53.80; H, 3.47; N, 9.65. Found (percent): C, 54.00; H, 3.56; N, 9.95.

Example 3

A mixture of 0.58 g. of 6-ethyl-6,9-dihydro-2-hydroxy-9-oxothiazolo[5,4-f]-quinoline-8-carboxylic acid, 0.41 g. of potassium carbonate, 1.05 g. of methyl iodide and 12 ml. of dimethylformamide was stirred at 90–100° C. for 1.5 hours. After removal of the insoluble material, the reaction mixture was concentrated in vacuo and the residue was treated with water. The resulting product was collected washed with water and dried. Recrystallization from methanol gave 0.51 g. (80%) of methyl 6-ethyl-2,3,6,9-tetrahydro-3-methyl-2,9-dioxothiazolo[5,4 - f] - quinoline-8-carboxylate as colorless needles melting at 274–275° C.

*Analysis.*—Calcd. for $C_{15}H_{14}O_4N_2S$ (percent): C, 56.60; H, 4.43; N, 8.80. Found (percent): C, 56.43; H, 4.16; N, 8.85.

A mixture of 0.32 g. of the methyl 6-ethyl-2,3,6,9-tetrahydro-3-methyl-2,9-dioxothiazolo[5,4-f]-quinoline-8 - carboxylate, 0.4 ml. of concentrated hydrochloric acid and 4 ml. of 90% acetic acid was refluxed for 1.5 hours with stirring. After cooling, the mixture was diluted with water and the crystals precipitated were collected by filtration, washed with water and dried. The crude product was recrystallized from dimethylformamide to give 0.21 g. (70%) of 6-ethyl-2,3,6,9-tetrahydro-3-methyl-2,9-dioxothiazolo[5,4-f]-quinoline-8-carboxylic acid as colorless needles, M.P.>300° C.

*Analysis.*—Calcd. for $C_{14}H_{12}O_4N_2S \cdot \frac{1}{4}H_2O$ (percent): C, 54.44; H, 4.08; N, 9.07. Found (percent): C, 54.69; H, 3.82; N, 9.04.

Example 4

By the same process as in Example 3, using ethyliodide instead of methyl iodide, 3,6-diethyl-2,3,6,9-tetrahydro - 2,9 - dioxothiazolo[5,4-f]-quinoline-8-carboxylic acid was prepared.

The crude intermediate, ethyl 3,6-diethyl-2,3,6,9-tetrahydro-2,9-dioxothiazolo[5,4 - f]-quinoline-8-carboxylate was recrystallized from methanol to give colorless needles, M.P. 235–237° C. Yield 75%.

*Analysis.*—Calcd. for $C_{17}H_{18}O_4N_2S$ percent): C, 58.96; H, 5.24; N, 8.09. Found (percent): C, 58.67; H, 4.98; N, 7.82.

Recrystallization from dimethylformamide gave 3,6-diethyl-2,3,6,9-tetrahydro-2,9-dioxothiazolo[5,4 - f]-quinoline-8-carboxylic acid as colorless needles, M.P.>300° C. Yield 91% (from the intermediate).

*Analysis.*—Calcd. for $C_{15}H_{14}O_4N_2S$ (percent): C, 56.59; H, 4.43; N, 8.80. Found (percent): C, 56.55; H, 4.41; N, 8.57.

Example 5

A mixture of 0.17 g. of 6-ethyl-6,9-dihydro-2-hydroxy-9-oxothiazolo[5,4-f]-quinoline-8-carboxylic acid, 0.18 g. of dimethyl sulfate and 0.14 g. of potassium hydroxide in 3.5 ml. of water was stirred for 2.5 hours at 70–80° C. After cooling the reaction mixture was collected by filtration. Recrystallization from dimethylformamide gave 0.14 g. (79%) of 6-ethyl-2,3,6,9-tetrahydro-3-methyl-2,9-dioxothiazolo[5,4-f]-quinoline-8-carboxylic acid as colorless needles melting at above 300° C. The infrared spectrum (solid phase) of the product was identical with that of the sample prepared in Example 3.

Example 6

A mixture of 0.29 g. of 6-ethyl-6,9-dihydro-2-hydroxy-9-oxothiazolo[5,4-f]-quinoline-8-carboxylic acid, 0.71 g. of methyl iodide and 4 ml. of ethanol in 5 ml. of aqueous 1 N sodium hydroxide solution was stirred for 1.5 hours at 70° C. After cooling, the reaction mixture was acidified with hydrochloric acid. The precipitated solid was collected, washed with water and dried. Recrystallization from dimethylformamide gave 0.24 g. (87%) of 6-ethyl-2,3,6,9-tetrahydro-3-methyl - 2,9 - dioxothiazolo[5,4-f]-quinoline-8-carboxylic acid as colorless needles melting at above 300° C. The infrared spectrum (solid phase) of the product was identical with that of the sample prepared in Example 3.

Example 7

A mixture of 0.28 g. of 6,9-dihydro-2-hydroxy-6-methyl-9-oxothiazolo[5,4-f]quinoline-8-carboxylic acid and 0.39 g. of diethyl sulfate in 5 ml. of aqueous 1 N sodium hydroxide was stirred for two hours at 70° C. After cooling the reaction mixture was acidified with hydrochloric acid and the precipitate was collected, washed with water and dried. Recrystallization from dimethylformamide gave 0.23 g. (74%) of 3-ethyl-2,3,6,9-tetrahydro-6-methyl-9-oxothiazolo[5,4-f]quinoline-8-carboxylic acid and colorless needles melting at above 300° C.

*Analysis.*—Calcd. for $C_{14}H_{12}O_4N_2S \cdot \frac{1}{4}H_2O$ (percent): C, 54.45; H, 4.08; N, 9.07. Found (percent): C, 54.51; H, 3.95; N, 8.95.

Example 8

A mixture of 0.55 g. of 6,9-dihydro-2-hydroxy-6-methyl-9-oxothiazolo[5,4-f]-quinoline-8-carboxylic acid, 0.53 g. of allyl bromide, 0.41 g. of potassium carbonate and 12 ml. of dimethylformamide was heated at 100–110° C. (bath temperature) with stirring for one hour. After cooling the mixture was concentrated in vacuo to dryness. To the crude allyl 3-allyl-2,3,6,9-tetrahydro-6-methyl-2,9-dioxothiazolo[5,4-f]-quinoline-8-carboxylate as it is, 30 ml. of concentrated hydrochloric acid-90% acetic acid (1:10) was gently added. The resulting mixture was refluxed with stirring for one hour. After cooling, water was added to the mixture. Crystals precipitated were collected by filtration, washed with water, dried and recrystallized from dimethylformamide to give 0.55 g. (87%) of 3-allyl-2,3,6,9-tetrahydro-6-methyl - 2,9 - dioxothiazolo[5,4-f]-quinoline-8-carboxylic acid as needles melting at above 300° C.

*Analysis.*—Calcd. for $C_{15}H_{12}O_4N_2S$ (percent): C, 56.95; H, 3.82; N, 8.86. Found (percent): C, 57.13; H, 3.76; N, 9.01.

Example 9

A mixture of 0.58 g. of 6-methyl-6,9-dihydro-2-hydroxy-9-dioxothiazolo[5,4-f]-quinoline-8-carboxylic acid, 0.53 g. of allyl bromide, 0.41 g. of potassium carbonate and 12 ml. of dimethylformamide was heated at 80–100° C. (bath temperature) for one hour. After reaction, the mixture was concentrated in vacuo to dryness. The residue, was washed with water, dried and recrystallized from methanol to give 0.43 g. (58%) of allyl 3-allyl-6-ethyl-2,3,6,9-tetrahydro-2,9-dioxothiazolo[5,4 - f]-quinoline-8-carboxylic as needles melting at 202–204° C.

*Analysis.*—Calcd. for $C_{19}H_{18}O_4N_2S \cdot \frac{1}{4}H_2O$ (percent): C, 60.87; H, 4.97; N, 7.47. Found (percent): C, 60.64; H, 4.88; N, 7.42.

To 4 ml. of concentrated hydrochloric acid-90% acetic acid (1:10) was added 0.26 g. of allyl 3-allyl-6-ethyl-2,3,6,9-tetrahydro - 2,9 - dioxothiazolo[5,4-f]-quinoline-8-carboxylate. The mixture was refluxed with stirring for 1.5 hours. After cooling, crystals precipitated were collected by filtration, washed with water, dried and recrystalized from dimethylformamide to give 0.16 g. (70%) of 3-allyl-6-ethyl-2,3,6,9-tetrahydro - 2,9 - dioxothiazolo-[5,4-f]-quinoline-8-carboxylic acid as needles melting at 300° C.

*Analysis.*—Calcd. for $C_{19}H_{18}O_4N_2S \cdot \frac{1}{4}H_2O$ (percent): C, 60.87; H, 4.97; N, 7.47. Found (percent): C, 60.64; H, 4.88; N, 7.42.

To 4 ml. of concentrated hydrochloric acid-90% acetic acid (1:10) was added 0.26 g. of allyl 3-allyl-6-ethyl-2,3,6,9-tetrahydro-2,9-dioxothiazolo[5,4-f] - quinoline-8-carboxylate. The mixture was refluxed with stirring for 1.5 hours. After cooling, crystals precipitated were collected by filtration, washed with water, dried and recrystallized from dimethylformamide to give 0.16 g. (70%) of 3-allyl-6-ethyl-2,3,6,9 - tetrahydro - 2,9 - dioxothiazolo-[5,4-f]-quinoline-8-carboxylic acid as needles melting at 300° C.

*Analysis.*—Calcd. for $C_{16}H_{14}O_4N_2S$ (percent): C, 58.18; H, 4.27; N, 8.48. Found (percent): C, 58.38; H, 4.23; N, 8.73.

Having now fully described the invention, it will be apparent to one of ordinary skill in the art that many changes and modifications can be made thereto without departing from the spirit or scope of the invention. Accordingly what is intended to be covered by Letters Patent is:

1. A compound having the formula

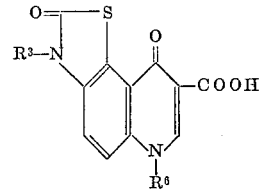

wherein $R^3$ represents a member selected from the group consisting of alkyl, having one to six carbon atoms, and allyl and $R^6$ represents an alkyl group having one to six carbon atoms.

2. The compound of claim 1, which is 3-methyl-6-ethyl-2,3,6,9-tetrahydro-2,9-dioxothiazolo[5,4-f]-quinoline - 8-carboxylic acid.

3. The compound of claim 1, which is 3-ethyl-6-methyl-2,3,6,9 - tetrahydro - 2,9 - dioxothiazolo[5,4-f]-quinoline-8-carboxylic acid.

4. The compound of claim 1, which is 3,6-diethyl-2,3,6,9 - tetrahydro - 2,9 - dioxothiazolo[5,4-f]-quinoline-8-carboxylic acid.

5. The compound of claim 1, which is 3,6-dimethyl-2,3,6,9 - tetrahydro - 2,9 - dioxothiazolo[5,4-f]-quinoline-8-carboxylic acid.

6. The compound of claim 1, which is 3-allyl-6-methyl-2,3,6,9 - tetrahydro - 2,9 - dioxothiazolo[5,4-f]-quinoline-8-carboxylic acid.

7. The compound of claim 1, which is 3-allyl-6-ethyl-2,3,6,9 - tetrahydro - 2,9 - dioxothiazolo[5,4-f]quinoline-8-carboxylic acid.

8. A process for preparing a compound having the formula

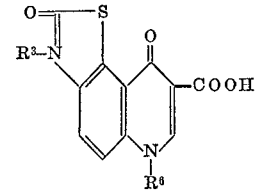

wherein R³ represents a member selected from the group consisting of alkyl, having one to six carbon atoms, and allyl and R⁶ represents an alkyl group having one to six carbon atoms, which consists of reacting a compound of the formula

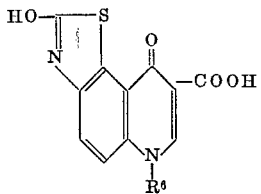

wherein R⁶ is the same as defined above, with an alkylating agent selected from the group consisting of alkyl halide, allyl halide and dialkyl sulfate.

9. The process as claimed in claim 8, wherein the reaction is carried out in aqueous solvent.

References Cited
UNITED STATES PATENTS 3,287,458  11/1966  Kaminsky _____ 260—287

DONALD G. DAUS, Primary Examiner

U.S. Cl. X.R.

260—287, 306, 999